US009482435B2

(12) United States Patent (10) Patent No.: US 9,482,435 B2
Meusburger (45) Date of Patent: Nov. 1, 2016

(54) METHOD FOR LIGHT EMITTING DEVICE PROTECTION AND PERFORMANCE IN AN APPLIANCE

(75) Inventor: Eric Xavier Meusburger, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 634 days.

(21) Appl. No.: 13/485,041

(22) Filed: May 31, 2012

(65) Prior Publication Data

US 2013/0319992 A1 Dec. 5, 2013

(51) Int. Cl.
| H05B 1/00 | (2006.01) |
| H05B 3/00 | (2006.01) |
| H05B 11/00 | (2006.01) |
| G05F 1/00 | (2006.01) |
| H05B 37/02 | (2006.01) |
| H05B 39/04 | (2006.01) |
| H05B 41/36 | (2006.01) |
| F24C 15/00 | (2006.01) |
| H05B 33/08 | (2006.01) |
| H05B 6/64 | (2006.01) |

(52) U.S. Cl.
CPC ............ *F24C 15/008* (2013.01); *H05B 6/6444* (2013.01); *H05B 33/089* (2013.01); *H05B 33/0854* (2013.01); *Y02B 20/341* (2013.01)

(58) Field of Classification Search
CPC ............ F24C 15/008; H05B 33/0854; H05B 33/089; H05B 6/6444
USPC .......... 219/220; 392/393; 315/297, 307, 309
See application file for complete search history.

(56) References Cited

U.S. PATENT DOCUMENTS

| 6,963,175 | B2 | 11/2005 | Archenhold et al. |
| 7,119,503 | B2* | 10/2006 | Kemper ........................ 315/309 |
| 7,262,559 | B2 | 8/2007 | Tripathi et al. |
| 7,262,752 | B2 | 8/2007 | Weindorf |
| 7,847,489 | B2 | 12/2010 | Lin |
| 7,928,670 | B2 | 4/2011 | Chen et al. |
| 7,990,077 | B2 | 8/2011 | Yu et al. |
| 2009/0118871 | A1* | 5/2009 | Debourke et al. ............ 700/282 |
| 2010/0193496 | A1* | 8/2010 | Jung et al. .................... 219/209 |
| 2010/0295688 | A1 | 11/2010 | Wu et al. |

FOREIGN PATENT DOCUMENTS

TW 2010/039694 A 11/2010

* cited by examiner

*Primary Examiner* — Dana Ross
*Assistant Examiner* — Lindsey C Teaters
(74) *Attorney, Agent, or Firm* — Dority & Manning, P.A.

(57) ABSTRACT

An appliance and method for variably controlling a drive signal to a light emitting device of the appliance based on a temperature value indicative of a temperature within a chamber of the appliance is provided. The light emitting device can be included in a display or disposed within a chamber of the appliance to provide illumination. The light intensity level of the light emitting device can be controlled based on the temperature value indicative of a temperature within the chamber. The temperature value indicative of a temperature within the chamber can be a value detected within the chamber, a value detected on a surface of the chamber, or a value that anticipates the temperature within the chamber. The light intensity can be controlled with a driving signal to the light emitting device. For instance, the light intensity can be controlled using pulse width modulation of the driving signal.

6 Claims, 6 Drawing Sheets

METHOD FOR LIGHT EMITTING DEVICE PROTECTION AND PERFORMANCE IN AN APPLIANCE

FIELD OF THE INVENTION

The present disclosure relates to an appliance having a light emitting device and more particularly to controlling a light intensity level of the light emitting device in an appliance using a variable driving signal.

BACKGROUND OF THE INVENTION

Appliances can include a light emitting device to transmit visual information to a user or to provide illumination within a chamber. The light emitting device can be a light emitting diode, a liquid crystal display, or other type of device that includes an element having a light intensity. The luminescence or light intensity level of the light emitting device can depend on various factors such as driving current or voltage. When the light emitting device is a light emitting diode (LED), driving the LED at a high current in a high temperature environment causes premature damage to the light emitting device.

Conventionally, light emitting devices in a display or an appliance chamber can include LEDs that are driven using a static direct drive where the current or voltage remains constant to achieve a light intensity level. A light emitting device including a LED is illumined at less than full intensity to prevent premature damage to the LED at higher temperatures. This causes the light intensity to be maintained at a low level, making it difficult for a user to read the display or see within the chamber. Increasing the light intensity level causes the premature damage to the LED because the component temperature increases as the current and voltage are increased to reach the higher light intensity level.

In another conventional approach, light emitting device in a display including a LED can be driven using a variable current. A temperature directly surrounding the LED can be detected and the light emitting diode can be driven based on the temperature detected in the area surrounding the device. However, this method increases the complexity of the detection and driving circuits and also increases the cost of the device.

While various methods for protecting light emitting diodes based on temperature are known, a need exists for an improved method of controlling a light intensity of a light emitting device in an appliance. A method of variably controlling the light intensity of the light emitting device in the appliance based on current operating conditions such as a temperature value in a chamber of the appliance would be useful. An appliance capable of increasing the light intensity while protecting the reliability of the light emitting device and adapting to various operating conditions would also be particularly useful.

BRIEF DESCRIPTION OF THE INVENTION

Aspects and advantages of the invention will be set forth in part in the following description, or can be obvious from the description, or can be learned through practice of the invention.

One exemplary aspect of the present disclosure is directed to an appliance including a light emitting device configured to emit light at a light intensity level. The appliance can also include a heating element disposed in a chamber of the appliance. The appliance can also include a controller configured to receive a temperature value indicative of a temperature within the chamber, the controller configured to control the light intensity level of the light emitting device based on the temperature value.

Another exemplary aspect of the present disclosure is directed to a method of controlling the light intensity of a light emitting device of an appliance. The method includes receiving a temperature value indicative of a temperature associated with the inside of a chamber of the appliance; determining a light intensity level for the light emitting device based on the temperature value; and controlling the light emitting device to substantially achieve the light intensity level.

Another exemplary embodiment of the present disclosure is directed to an oven. The oven can include a light emitting device. The oven can further include a cooking chamber that receives items within the chamber and a heating element disposed in the cooking chamber. The heating element can provide a heat source. The oven can also include a temperature sensor coupled to the cooking chamber, where the temperature sensor provides a signal indicative of a temperature inside the cooking chamber. A controller receives the signal indicative of a temperature inside the cooking chamber, determines a light intensity level for the light emitting device based on the temperature inside the cooking chamber, and controls the light emitting device to substantially achieve the light intensity level.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
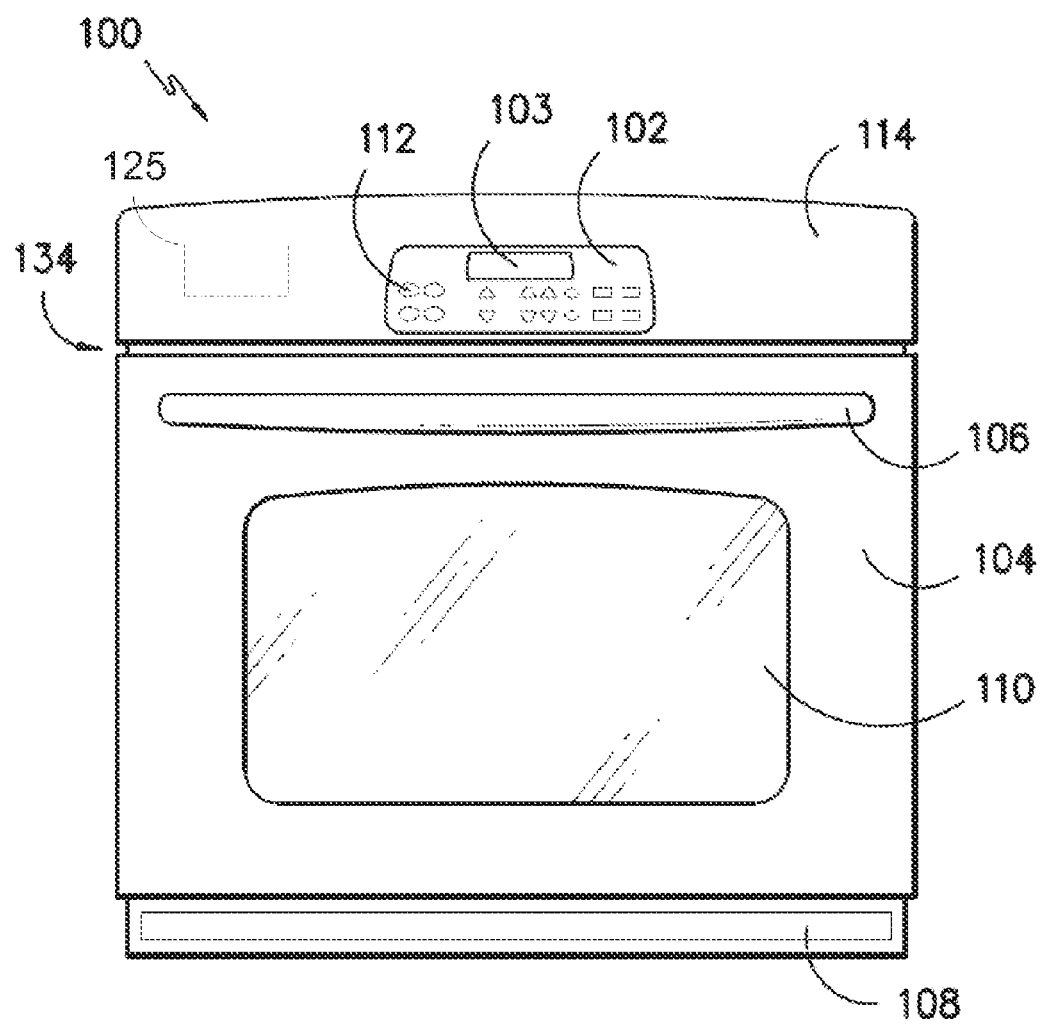
FIG. 1 provides a front view of an exemplary oven according to an exemplary embodiment of the present disclosure.

Reference now will be made in detail to embodiments of the invention, one or more examples of which are illustrated in the drawings. Each example is provided by way of explanation of the invention, not limitation of the invention.

In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present disclosure relates to an appliance and method for variably controlling a drive signal to a light emitting device of the appliance based on a temperature value indicative of a temperature within a chamber of the appliance. The light emitting device can be included in a display or disposed within a chamber of the appliance to provide illumination. The light emitting device can include a light emitting diode or other suitable light emitting device. The light intensity level of the light emitting device can be controlled based on the temperature value indicative of a temperature within the chamber. The temperature value indicative of a temperature within the chamber can be a value detected within the chamber, a value detected on a surface of the chamber, or a value that anticipates the temperature within the chamber. For instance, the light intensity level can be controlled based on a signal from a sensor that detects the temperature within the chamber. Alternatively, the light intensity level can be controlled based on a desired operation condition for the chamber. The light intensity can be controlled with a driving signal to the light emitting device. For instance, the light intensity can be controlled using pulse width modulation of the driving signal. Alternatively, the light intensity can be controlled using triac control where the triac control can provide a variable dimmer to modify the light intensity.

Figure 2:
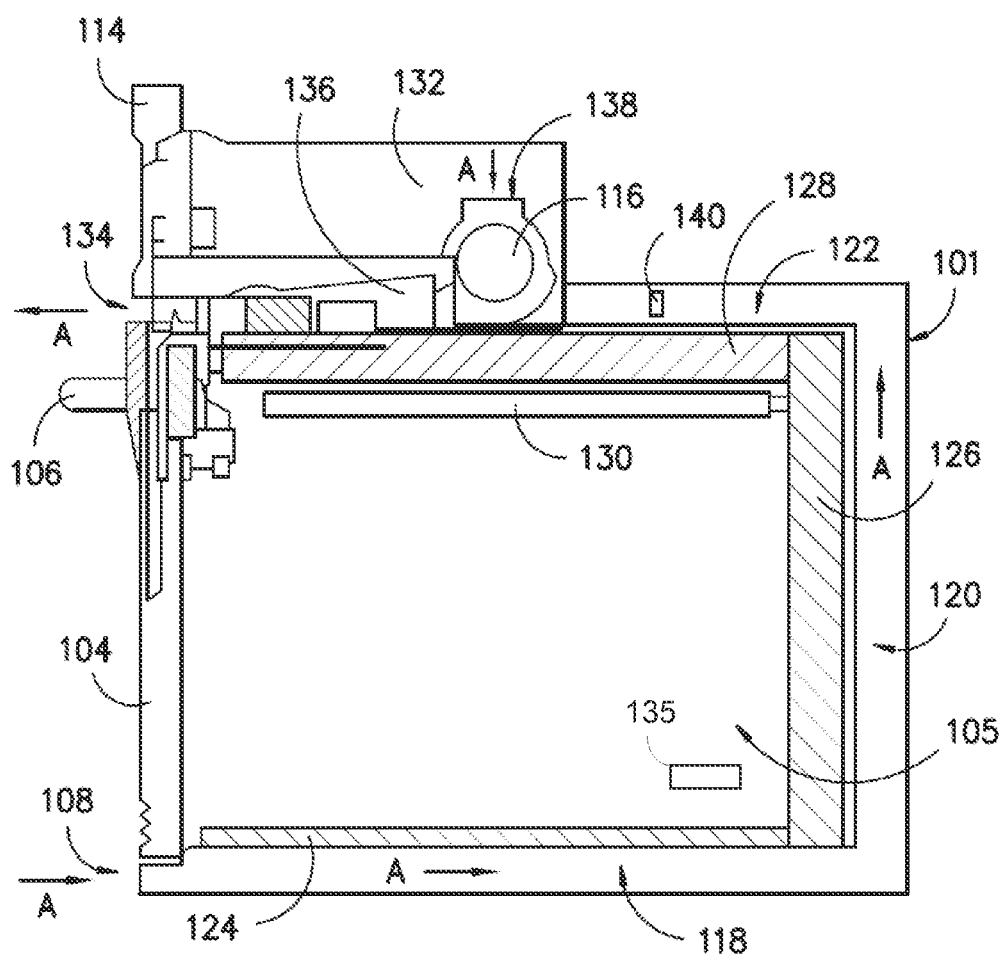
FIG. 2 provides a cross-sectional view of the exemplary oven depicted in FIG. 1.

Referring to FIGS. 1 and 2, an oven 100 according to an exemplary embodiment of the present disclosure is shown. While the present disclosure will be discussed with reference to an oven, the systems and methods according to embodiments of the present disclosure are not limited to use with ovens and can be used with any other appliance having a chamber such as clothes dryers, air conditioners, refrigerators, space heaters, furnace, etc.

FIG. 1 provides a front view of oven 100 while FIG. 2 provides a cross-sectional view. Oven 100 includes a door 104 with handle 106 that provides for opening and closing access to a cooking chamber 105. A user of the appliance 100 can place a variety of different items to be cooked in chamber 105. A heating element 130 at the top of chamber 105 provides a heat source for cooking. Heating element 130 can be any type of heating element such as gas, electric, microwave, or a combination thereof. Other heating elements could be located at the bottom of chamber 130 as well. Racks (not shown) in chamber 105 can be used to place food items at various levels for cooking within the oven. A window 110 on door 104 allows the user to view food items during the cooking process. In addition, a light emitting device (not shown) can be disposed in the cooking chamber 105 to provide illumination within the chamber. The light emitting device can be a LED, an incandescent lamp, a halogen lamp and/or any other suitable light emitting devices.

Oven 100 includes a user interface 102 having a display 103 at a top panel 114 with a variety of controls 112. Display 103 can provide visual information to a user. The display 103 can include one or more light emitting devices such as a light emitting diode, a liquid crystal display, or any other type of light emitting device. The light emitting device can emit light at a light intensity. According to aspects of the present disclosure, the light intensity is variable with respect to a temperature associated with the inside of the cooking chamber.

Interface 102 allows a user to select various options for the operation of oven 100, including for instance, temperature, time, and/or various cooking and cleaning cycles. Operation of oven appliance 100 can be regulated by a device controller 125 that is operatively coupled i.e., in communication with, user interface panel 102, heating element 130, and other components of oven 100 as will be further described. Alternatively, the user interface panel 103 can have a separate display controller that is coupled to a device controller.

In response to user manipulation of the user interface panel 102, the device controller 125 can operate heating element 130. The device controller 125 or the display controller can receive measurements from a temperature sensor 135 placed in cooking chamber 105 and for instance provide a temperature indication to the user with display 103. Temperature sensor 135 can be located anywhere inside the cooking chamber 105. Alternatively, temperature sensor 135 can be coupled with an outside surface of the cooking chamber 105 where the sensed temperature from the location on the outside surface of the cooking chamber 105 is indicative of the temperature within the cooking chamber 105. In addition, an additional temperature sensor can also be located inside the appliance, for example in the interface panel 102. The device controller 125 and/or the display controller can also be provided with other features as will be further described herein.

By way of example, the device controller 125 and/or the display controller can include a memory and one or more processing devices such as microprocessors, CPUs or the like, such as general or special purpose microprocessors operable to execute programming instructions or microcontrol code associated with operation of appliance 100. The memory can represent random access memory such as DRAM, or read only memory such as ROM or FLASH. In one embodiment, the processor executes programming instructions stored in memory. The memory can be a separate component from the processor or can be included onboard within the processor.

The device controller 125 can be positioned in a variety of locations throughout appliance 100. In the illustrated embodiment, the controller can be located under or next to the user interface 102 otherwise within top panel 114. In such an embodiment, input/output ("I/O") signals are routed between the controller and various operational components of appliance 100 such heating element 130, controls 112, display 103, sensor(s), alarms, and/or other components as can be provided. In one embodiment, the user interface panel 102 can represent a general purpose I/O ("GPIO") device or functional block.

Although shown with touch type controls 112, it should be understood that controls 112 and the configuration of appliance 100 shown in FIG. 1 are provided by way of example only. More specifically, user interface 102 can include various input components, such as one or more of a variety of electrical, mechanical or electro-mechanical input devices including rotary dials (knobs), push buttons, toggle/rocker switches, and touch pads. The user interface 102 can include other display components, such as a digital or analog display device designed to provide operational feedback to a user. The user interface 102 can be in communication with the controller via one or more signal lines or shared communication busses. Also, oven 100 is shown as a wall oven but the present disclosure could also be used with other appliances such as e.g., a stand-alone oven, an oven with a stove-top, and other configurations as well.

As stated, during operation of oven 100 in both cooking and cleaning cycles, the temperatures that are needed in chamber 105 can be high. Insulation panels 124, 126, and 128 in the bottom, rear, and top of oven 100 help confine heat generated within the chamber by minimizing and reducing heat transfer from oven 100 to e.g., surrounding cabinetry. Additionally, oven 100 is provided with a ventilation system whereby ambient air is used to help cool appliance 100.

For instance, oven 100 includes air passageways 118, 120, and 122 located within the bottom, rear, and top of the cabinet 101 of oven 100. A blower or fan 116 located in cavity 132 pulls heated air into its inlet 138. This air is forced through duct 136 and exits oven 100 through vent 134 located between door 104 and top panel 114. Fan 116 pulls air from the electronics bay (enclosure) 132, which is connected with air passageways 118, 120, 122. Cooler air from the ambient is pulled into air passageway 118 through air inlet 108, which is located below door 104. The flow of air is indicated by arrows A in FIG. 2.

The ventilation system described for oven 100 is provided by way of example only. As will be understood by one of skill in the art using the teachings disclosed herein, numerous other configurations can be used as well. By way of example, the flow of air can be reversed by changing the direction of operation of fan 116, causing cooler air to enter at 134 and hot air to be exhausted at 108. Different arrangements of the air passageways can also be used as well, including air passageways in the left and right sidewalls of the oven.

Figure 3:
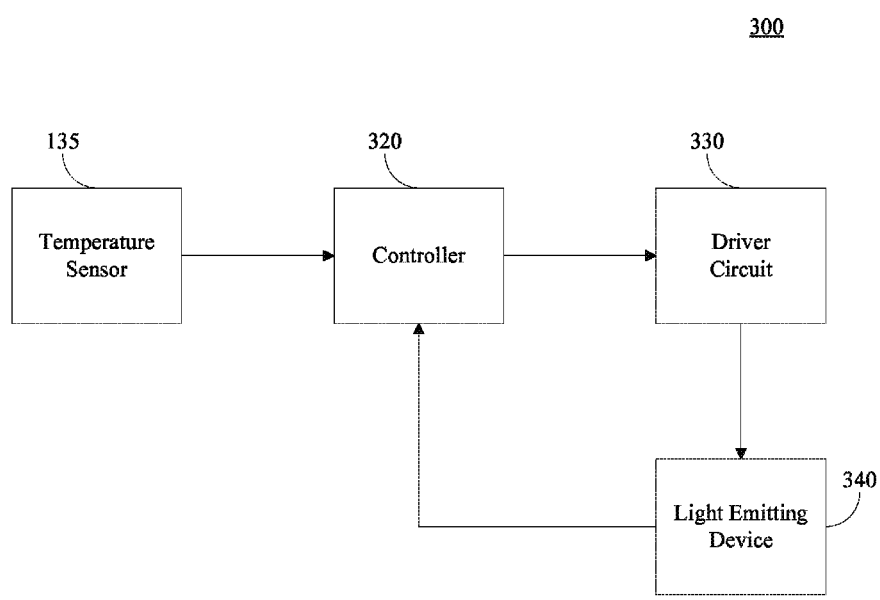
FIG. 3 provides a block diagram of an exemplary light emitting device control system according to an exemplary embodiment of the present disclosure.

With reference now to FIG. 3, there is illustrated an exemplary embodiment of a schematic block diagram of an appliance display control system. The appliance display control system can include a temperature sensor 135 coupled to a controller 320, where the temperature sensor 135 can be located within an appliance chamber or coupled with an outside surface of the chamber. A driver circuit 330 can be coupled between the controller 320 and a light emitting device 340. The light emitting device 340 can be coupled to the controller 320 to provide a feedback signal to the controller 320 where the feedback can be indicative of the light intensity level at which the light emitting device 340 is currently operating. The light emitting device 340 can be included in any portion of the appliance such as in a display or disposed within the appliance chamber to provide illumination within the chamber. In addition, the light emitting device 340 can be an LED, an incandescent lamp, a halogen lamp, and/or any other type of light source.

Temperature sensor 135 can sense a temperature indicative of the temperature inside chamber 105. Sensor 135 can be located in the chamber 105 and coupled to the controller 320. Alternatively, the temperature sensor 135 can be coupled to an outside surface of the chamber. After a temperature indicative of a temperature inside the chamber is detected, the temperature sensor 135 can be configured to send a signal to the controller 320 indicative of the temperature inside the chamber 105. For instance, when a user inputs a desired temperature for cooking or cleaning of the oven, temperature sensor 135 can detect the temperature inside the oven chamber 105. As the temperature increases, the sensor 135 continues to monitor and communicate the present temperature detected inside the chamber 105.

Alternatively, rather than an actual temperature reading, the display controller 320 can generate a signal from memory indicative of an anticipated temperature inside the chamber. The anticipated temperature can be a predetermined temperature and the signal indicative of the anticipated temperature inside the chamber can be communicated to the controller. The signal can include a predetermined function such as an equation, lookup table, or algorithm that correlates to the anticipated temperature inside the chamber 105. In addition, this signal can include information representing a time interval, where the time interval can be indicative of how long it will take to reach the predetermined temperature within the chamber. This information representing a signal indicative of a temperature within a chamber can be transmitted from memory to the processor of the display controller.

The controller 320 can provide a driving signal to the light emitting device via the driver circuit 330 to control the light intensity level of the light emitting device 340. The light intensity level can be dynamically or variably determined by the controller 320 according to the temperature value indicative of the temperature inside the chamber 105.

The light emitting device 340 can include one or more light emitting devices. For instance, the light emitting device can include more than one light emitting diode. Each light emitting device can be variably controlled or all the light emitting devices can be controlled uniformly.

In one embodiment, controller 320 can determine a first light intensity level when the temperature value is greater than a predetermined threshold. A second light intensity level can be determined when the temperature value is less than a predetermined threshold. Alternatively, the current light intensity level can be maintained when the temperature value is substantially equal to the predetermined threshold. The predetermined threshold can be a single temperature value or a temperature range.

The controller 320 can send a signal indicative of the light intensity level to the driver circuit 330. Based on the command from the controller, the driver circuit 330 can drive the light emitting device 340 in various ways such as using direct drive or pulse width modulation. In direct drive methods, the driver circuit 330 can supply a percentage of desired current or voltage for the time interval the light emitting device 340 is driven at the driving signal. For instance, to achieve a reduced light intensity level, the maximum current or voltage could be applied constantly at a reduced magnitude.

Alternatively, using pulse width modulation, light emitting device 340 can be driven by modifying the duty cycle of the signal. A duty cycle is a ratio between the duration a signal pulse is in the active state to the total period of the signal. For example, to achieve a reduced light intensity level, a maximum current or voltage signal could be applied to the light emitting display at a reduced duty cycle.

In an alternative embodiment, the driver circuit 330 can include a control triac (not shown). A control triac can be used as a variable dimmer to control the light intensity of the light emitting device 340.

Figure 4:
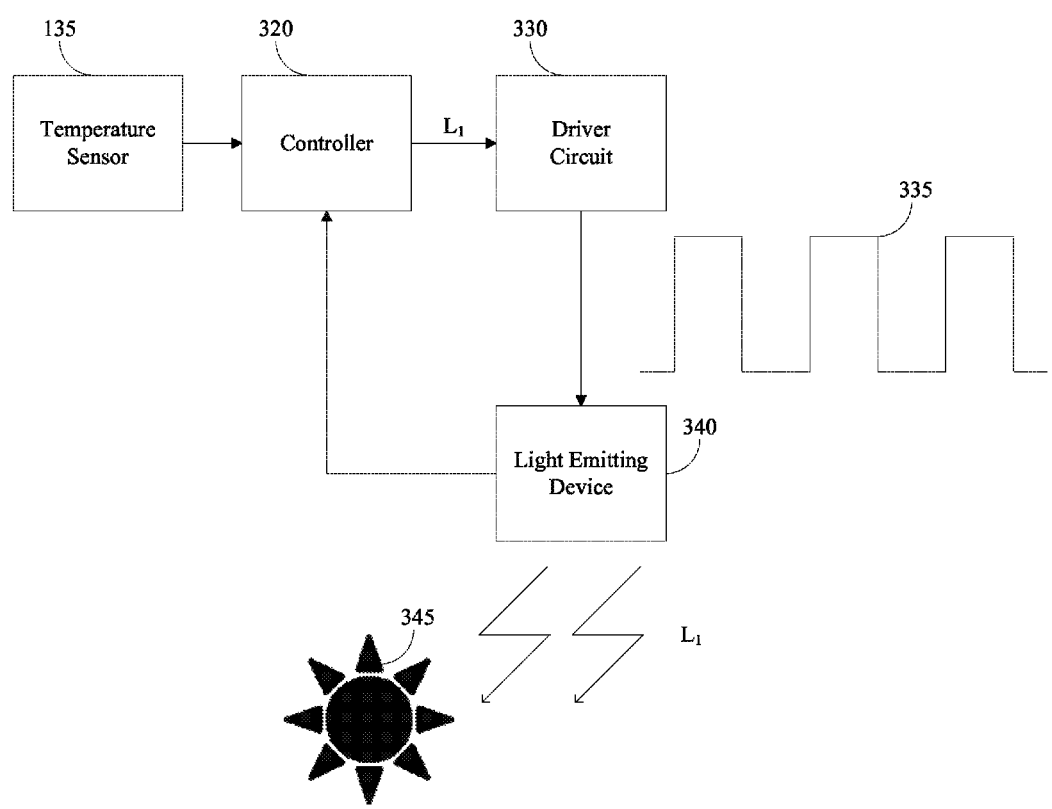
FIG. 4 provides a block diagram of an exemplary light emitting device control system according to an exemplary embodiment of the present disclosure.
Figure 5:
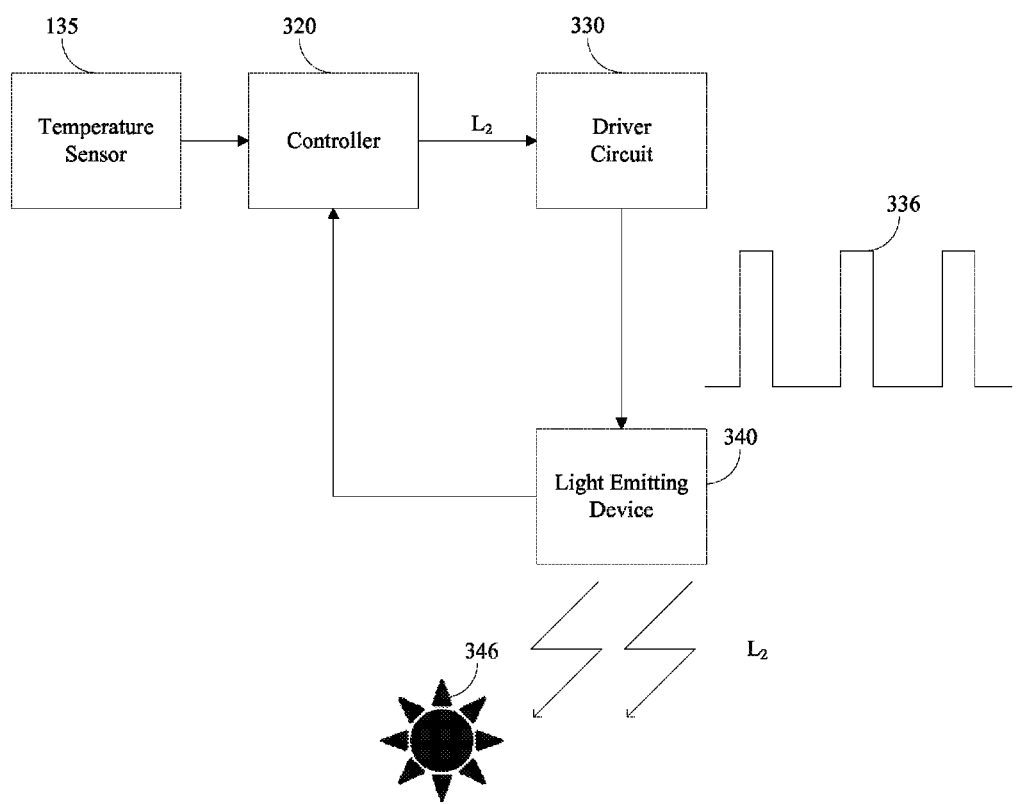
FIG. 5 provides a block diagram of an exemplary light emitting device control system according to an exemplary embodiment of the present disclosure.

FIGS. 4 and 5 illustrate exemplary embodiments of a schematic block diagram of the appliance display control system.

As shown in FIG. 4, the temperature sensor 135 can sense the temperature indicative of the temperature within the chamber of the oven. The controller 320 receives a signal indicative of the temperature within the chamber and sends a signal to the driver circuit 330 to achieve a first light intensity level ($L_1$). Driver circuit 330 generates a signal 335 having a duty cycle as illustrated in FIG. 4. The light emitting device 340 receives the signal 335 and the light emitting device 340 emits light at a first light intensity level 345.

As shown in FIG. 5, the temperature sensor 135 senses a temperature greater than the temperature sensed in FIG. 4. The controller 320 receives the signal indicative of the higher temperature within the chamber and sends a signal to the driver circuit 330 to achieve a first light intensity level ($L_2$), which is less than the first light intensity level ($L_1$). The driver circuit 330 generates a signal 336 having a duty cycle less than signal 335, as shown in FIG. 5. The light emitting device 340 receives the signal 336 and the light emitting device 340 emits light at a second light intensity level 346.

A signal 335, as shown in FIG. 4, can be supplied to light emitting device 340 using pulse width modulation to control the light intensity level 345. As previously discussed, the duty cycle directly correlates to the light intensity levels. Therefore, when a signal 336 having a lesser duty cycle, as shown in FIG. 5, is supplied to the light emitting device 340, the light emitting device 340 is driven to produce an output having a lesser light intensity level 346 than that of FIG. 4.

Figure 6:
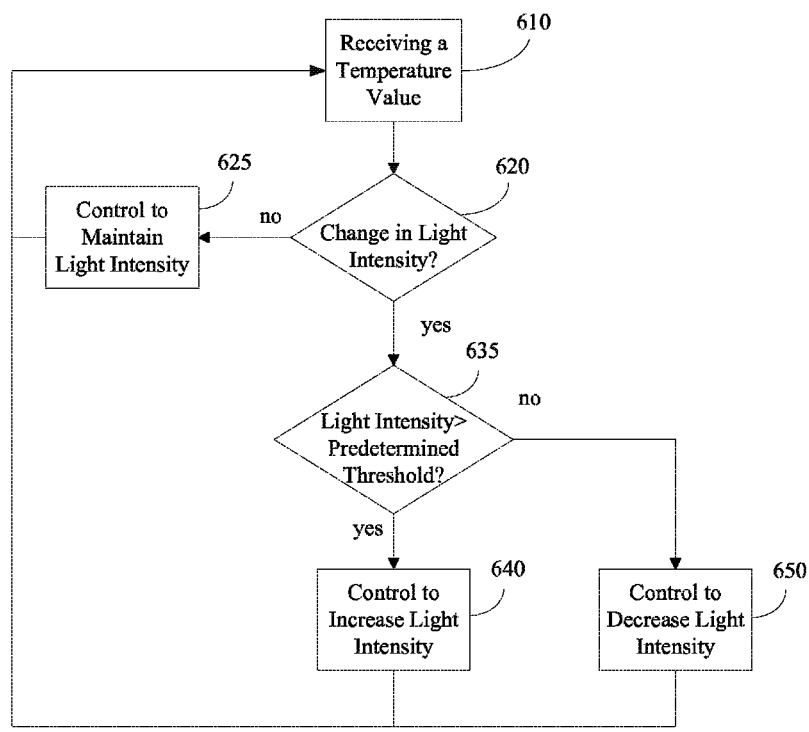
FIG. 6 provides a flow chart of a method of controlling a light emitting device in an appliance according to an exemplary embodiment of the present disclosure.

FIG. 6 illustrates a flow chart of an exemplary method 600 according to an exemplary embodiment of the present disclosure. The method 600 will be discussed with reference to the exemplary appliance light emitting device control system illustrated in FIGS. 3-5. However, the method 600 can be implemented with any suitable appliance display control system. In addition, although FIG. 6 depicts steps performed in a particular order for purposes of illustration and discussion, the methods discussed herein are not limited to any particular order or arrangement. One skilled in the art, using the disclosures provided herein, will appreciate that various steps of the methods can be omitted, rearranged, combined and/or adapted in various ways.

The temperature value indicative of a temperature within the chamber of the appliance is received by the controller 320 at (610). This temperature value could be transmitted from a temperature sensor 135 located within a chamber or coupled with an outside wall of the chamber. Alternatively, it could be a signal produced by the controller 320 based on an anticipated temperature profile inside the chamber. The controller 320 can determine in (620) to change in light intensity level of a light emitting device based on signal indicative of a temperature within the chamber and a feedback from a light emitting device 340. The light intensity level can be determined through various methods, such as a lookup table, an equation, or an algorithm.

The controller 320 sends a signal to the driver circuit 330 to control the driving signal to substantially maintain the current light intensity level at (625). For the purpose of this application, "substantially" means within 10% of the intended control level.

When the controller 320 determines that the signal indicative of a temperature in a chamber indicates a change in light intensity, the indicated change in light intensity is compared with a predetermined threshold in (635). The predetermined threshold can be a single value or a range of values.

When the indicated light intensity is greater than the predetermined threshold, the controller 320 can control the driver circuit 330 to increase the light intensity level in (640) and substantially maintain the new light intensity level of the light emitting device 340. When the indicated light intensity is less than the predetermined threshold, the controller 320 can control the driver circuit 330 to decrease in light intensity level in (650) and substantially maintain the new light intensity level of the light emitting device 340. Method 600 can be performed once or a plurality of times during an operational cycle, where an operational cycle can be a portion or an entire heating cycle corresponding to a user input.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method of controlling the light intensity of a light emitting device of an appliance comprising:
   receiving a temperature value associated with an anticipated temperature associated with the inside of a chamber of the appliance, the anticipated temperature corresponding to a user input of a desired temperature for the inside of the chamber of the appliance, the temperature value being determined based at least in part on a signal transmitted from memory indicative of a time interval specifying an expected amount of time required for the inside of the chamber of the appliance to reach the anticipated temperature;
   determining a light intensity level for the light emitting device based on the time interval; and
   controlling the light emitting device to substantially achieve the light intensity level.

2. The method as in claim 1, wherein controlling the light emitting device to substantially achieve the light intensity level comprises adjusting a driving signal provided to the light emitting device.

3. The method as in claim 2, wherein the driving signal is a current control signal or a voltage control signal.

4. The method as in claim 1, wherein controlling the light emitting device comprises controlling one or more light emitting devices.

5. The method as in claim 1, wherein determining a light intensity value for the light emitting device based on the time interval comprises:
   comparing the temperature value with a predetermined threshold; and
   adjusting a driving signal provided to the light emitting device based on the difference between the temperature value and the threshold.

6. The method as in claim 1, wherein the light emitting device is a display.

* * * * *